May 21, 1940.   W. L. MORRISON   2,201,374
VENTILATING DEVICE
Original Filed Nov. 8, 1929
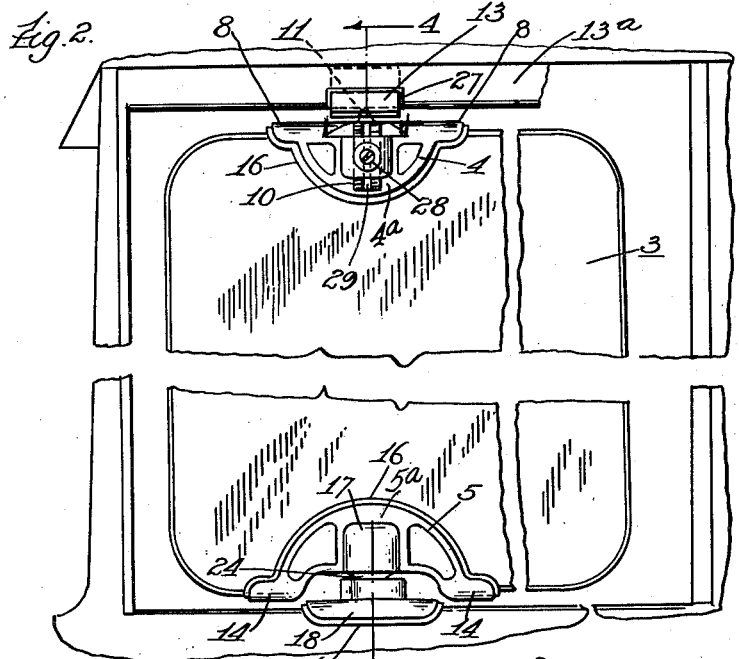
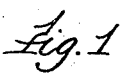
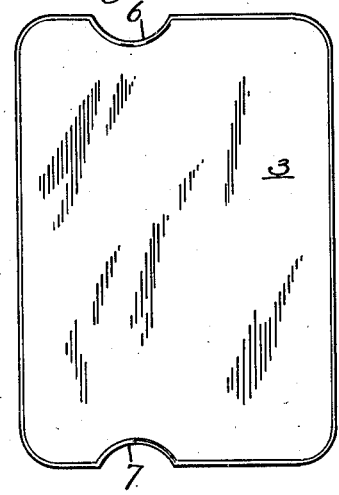
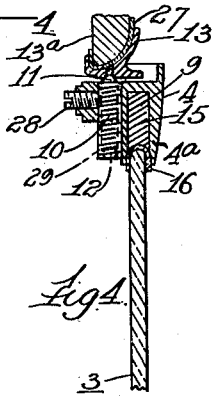
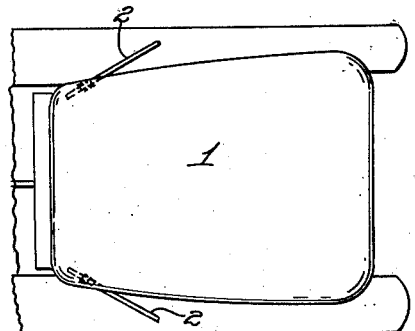
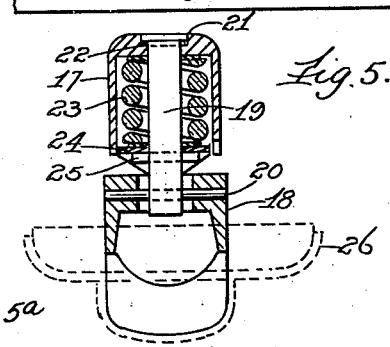
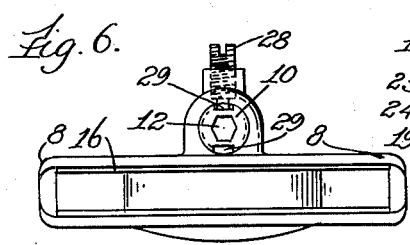
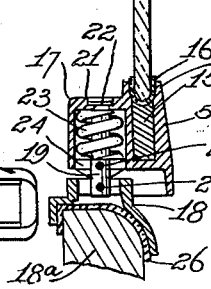
Inventor.
Willard L. Morrison.
by Parker & Carter
his Attorneys.

Patented May 21, 1940

2,201,374

UNITED STATES PATENT OFFICE 2,201,374

VENTILATING DEVICE

Willard L. Morrison, Lake Forest, Ill.

Application November 8, 1929, Serial No. 405,674
Renewed April 7, 1939

19 Claims. (Cl. 296—84)

This invention relates to improvements in ventilating devices and has for its object to provide a new and improved device of this description.

When automobiles are being driven, it is important to have the window at the side where the driver is located, open so that he can signal. When this window is open, it often happens that too much air comes in and there is too much of a draft and this is particularly true in cold or bad weather.

One of the objects of my invention is to provide a ventilating device for an automobile window which will still permit the window to be open for signalling and ventilating purposes, but will prevent undue drafts and undesirable admission of air and also keep out the rain.

The invention has as a further object to provide a simple, effective ventilating device of this description which can be manufactured at a low cost and easily and quickly installed in any automobile and which will have no obstructing device extending across the glass.

The invention has further objects which are more particularly pointed out in the accompanying description.

Referring now to the drawing, Fig. 1 is a diagrammatic view showing a plan view of an automobile with parts broken away, with the ventilating device in position.

Fig. 2 is an enlarged inside view of one of the windows showing the ventilating device in position.

Fig. 3 is a view of the glass plate of the ventilating device with the holding devices removed.

Fig. 4 is a sectional view of the ventilating device taken on line 4—4 of Fig. 2.

Fig. 5 is an enlarged sectional view through one of the holding devices at one end of the ventilating device for holding it in position.

Fig. 6 is a plan view of the other holding device at the other end of the ventilating device.

In Fig. 1 I have illustrated diagrammatically, a plan view showing an automobile body 1 with the ventilating devices 2 in position, one at each window at each side of the automobile. Each ventilating device consists of a single plate of glass 3 without a frame, that is, the edges are frameless. At the top and bottom edges are placed holding devices 4 and 5 which have no connection with each other but which are connected with the glass plate and are in the same plane as the plate and which engage the window frame so as to hold the ventilating device in the proper position.

In the construction shown, the glass plate is cut away at the top and bottom to provide notches 6 and 7. Holding devices 4 and 5 are located at these notches and have no connection with each other except through the glass, there being no connecting piece across the glass to act as an obstruction or to interfere with looking through the glass. The holding devices are preferably both adjustable. The holding device at the top consists of a body portion 4 which fits over the edge of the glass at the groove 6 and which is preferably provided with laterally extending portions 8. The body portion has a recess 9 into which the edge of the glass is received, there being portions of the body portion on each side of the glass, as clearly shown in Figs. 2 and 4, which form flanges 4a, 5a, as it were.

These flanges extend entirely around the body portion of the holding device and prevent lateral movement thereof with relation to the glass. An adjustable engaging member 10 is connected with the body portion and is provided with an engaging end 11. This adjusting device is shown as a screw threaded member working in a screw threaded opening in the body portion of the holding device and is provided with a hole 12 for a wrench pin or the like to rotate it to adjust it. The engaging end 11 engages a member 13 which fits over the window frame 13a. The other holding device is provided with a body portion 5 which fits over the notch 7 in the glass and is recessed to receive the edge of the glass. It is provided with projections 14 on each side, the projections extending along the edge of the glass, as shown in Fig. 2, there being portions on each side of the glass which form flanges to prevent lateral movement, and hold the device in proper position. These flanges 4a, 5a preferably extend entirely around the holding device. Some suitable non-metallic material is inserted in the groove in the body of the holding devices so that the glass does not make contact with the metal. Any suitable material for this purpose may be used. I have shown, for example, a construction wherein I first put plastic wood 15 in the groove and then provide a mat 16 of rubber cloth or the like and press the body portions on to the glass. The plastic wood hardens after the parts are in position and a tight connection is made between the holding devices and the glass. The bottom holding device is provided at the side with a receptacle 17. The engaging member 18 which engages the window sill 18a is connected with a pin 19 by means of a suitable rocking connection, the member 13 is a part of the holding device 4 and the member 18 is a part of the holding device 5.

As herein shown, this connection is formed by the pivot 20 which passes through the engaging device and through the pin. This pin is inserted in the receptacle and the end 21 is upset so as to prevent removal. I prefer to recess the hole in the receptacle into which this end 21 is received and to provide a washer 22 of brass between the enlarged end of the pin and the receptacle. This prevents seizing and bending of the device. I provide in the receptacle a spring 23 which surrounds the pin 19. A washer 24 is connected with the pin by a rivet 25 and engages one end of the spring, the other end engaging the receptacle as shown in Fig. 4. This permits the engaging device 18 to rock with relation to its body portion 5 so that a proper adjustment of the device to the irregularities of the particular frame with which it is connected is secured.

I prefer also to provide non-metallic pieces 26 and 27 between the engaging devices 18 and the window frames 18a and 13a. The end 11 of the member 10 has a rocking connection with the engaging member 13. This is secured in the particular construction shown by making the end 11 rounded, the end then fitting into a small recess in the engaging device 13, as shown in Fig. 4. The engaging member 10 is held in its adjusted position by a set screw 28. This member is provided with one or more grooves 29 into which the end of the set screw is received. The spring 23 provides an elastic connection between the window frame and the glass and in addition to taking up the jars, insures a tight connection between the glass and the upper and lower window frame members when the engaging member 10 is tightened. The spring has a further function in that it holds the glass at any desired angle with relation to the window. It is only necessary to move the glass to the desired angular position. During this movement, the receptacle 17 and the pin 19 move relatively and after the movement has been secured by pushing the edge of the glass, the spring 23 holds the glass in this angular position against the resistance of the air due to the movement of the vehicle.

It will be seen that by means of this construction, the same engaging device may be used for windows of all sizes, it only being necessary to have glasses of different sizes but these glasses may have the same sized notches cut in them. This, therefore, greatly cheapens the construction and makes it unnecessary to have a large variety of different parts for different sized windows. This construction also has an additional advantageous feature in that orders can be quickly filled for the holding device may be made up in advance as they can be used on any window and then when an order comes in all that is necessary is to cut the glass of the proper size and fasten the holding devices to it.

The use and operation of my invention are as follows.

In assembling the device the glass has the notches cut in it at the top and bottom and the holding devices are placed in position with a suitable packing of non-metallic material between them and the glass. The body portion of the holding devices slip over the edge of the glass and are held in position thereon. In attaching the devices to the automobile, the engaging part 11 is screwed inwardly and the engaging member 18 is placed on the lower window frame. The engaging member 13 is then placed in position on the upper window frame and the engaging member 10 is adjusted to press against the member 13 until the members 13 and 18 are tightly pressed against the window frame.

The member 18 rocks about its pivot to accommodate for any irregularities in the window frame so that the device automatically adjusts itself to the various conditions presented. The glass may then be moved to the desired angle in which it is desired to use it. The glass plate has several functions, one to prevent drafts, the other to act as a transparent medium and a further function in that it acts as a resisting element between the two holding devices, the glass directly having this function without any separate connection between the holding devices.

It is, of course evident that the device may be used on any and all of the windows of the automobile if desired.

I claim:

1. A ventilating device comprising a plate of glass, two holding devices at opposite edges of said glass and having body portions in the plane of the glass, and separate means connected with said glass for directly and separately connecting said holding devices with the window frame and means, of which the plate of glass forms a part, for forcing said holding devices apart to keep them in proper engagement with the window frame.

2. A ventilating device comprising a plate of glass, two holding devices at opposite edges of the glass plate for engaging the window frame, means for preventing lateral movement of the holding devices with relation to the glass when they are in position and adjustable members engaging the window frame and forming a part of each of the holding devices one of said adjustable members being provided with adjusting means, which when adjusted, simultaneously acts to press the adjustable members toward the window frame and the portion of the holding device engaging the glass toward the glass.

3. A ventilating device comprising a plate of glass, two holding devices at opposite edges of the glass plate for engaging the window frame, means for preventing lateral movement of the holding devices with relation to the glass when they are in position and adjustable members engaging the window frame and forming a part of each the holding devices, said members being connected to body portions which are in the plane of the glass one of said adjustable members being provided with adjusting means, which when adjusted simultaneously acts to press the adjustable members toward the window frame and the portion of the holding device engaging the glass toward the glass.

4. A ventilating device comprising a plate of glass, two holding devices at opposite edges of said glass and having body portions in the plane of the glass, means for connecting said holding devices with the window frame, said means comprising a part which engages the window frame, the said part having a rocking connection on an axis substantially parallel with the window sill with the body portion of the holding device with which it is connected.

5. A ventilating device comprising a plate of glass, two holding devices at opposite edges of the glass connected together only by the glass, one of said holding devices having a body portion which encloses the edge of the glass and an engaging device for engaging the window frame, said engaging device having a lateral rocking connection with the body portion of the holding device.

6. A ventilating device comprising a plate of glass, two holding devices at opposite edges of the glass connected together only by the glass, one of said holding devices having a body portion which encloses the edge of the glass and an engaging device for engaging the window frame, said engaging device having a rocking and an elastic connection with the body portion of the holding device.

7. A ventilating device comprising a plate of glass, holding devices for holding said glass in position therein, one of said holding devices comprising a body portion having a recess into which the edge of the glass is received, a receptacle at the side of said body portion and forming a part thereof, a spring in said receptacle, a pin surrounded by said spring, and having one end connected with the receptacle, and an engaging part connected with said pin for engaging the window frame in proximity to the holding device with which it is associated.

8. A ventilating device comprising a plate of glass, holding devices for holding said glass in position, one of said holding devices comprising a body portion having a recess into which the edge of the glass is received, a receptacle at the side of said body portion, a spring in said receptacle, a pin surrounded by said spring, and having one end connected with the receptacle, an engaging part connected with said pin for engaging the window frame and a binding reducing part interposed between said pin and said receptacle.

9. A ventilating device comprising a glass plate, holding devices connected to opposite edges of said glass, said holding devices engaging the window frame means for pressing the holding devices apart so that the portions thereof engaging the window frame will be pressed toward the window frame, the glass plate acting to exclude drafts and as a transparent medium and also acting as the sole resisting element between the two holding devices for transmitting the pressure which causes the holding devices engaging the window frame to be pressed apart.

10. A ventilating device for inserting in the window frame of an automobile comprising a glass plate, holding members at the top and bottom of said plate for connecting it to the window frame, said holding members being connected together solely by the glass plate, whereby the entire width of the glass plate is free from sight obstructing parts and means for exerting a spreading pressure on the holding members at the top and bottom of the plate to spread them apart, said spreading pressure being transmitted solely by the glass plate.

11. The combination with a vehicle window opening bounded by reveals, and a wind deflecting shield associated therewith, of means for supporting the shield on said reveals, comprising oppositely disposed pads connected to the top and lower edges of said shield and arranged to tightly engage over the upper and lower reveals in such a manner that the weight of the shield will be carried by and disposed directly on said lower reveal, bracket means for pivotally connecting said pads to said edges of the shield and arranged to permit said shield to be adjusted to different wind deflecting positions in the window opening, and means for adjusting one of said pads toward or away from the other to bring said pads into engagement with the reveals.

12. The combination with a vehicle window opening adapted to have a window pane moved into the same, and bounded by reveals, and a vertical wind deflecting shield associated therewith, of means for supporting the shield on said reveals, comprising a pair of bracket devices connected to the upper and lower edges of the shield, and including means for engaging the upper and lower reveals of the window opening to support the shield for swinging movement into said window opening so as to enable the adjustment of the shield when in use to different angular wind deflecting positions, each of said bracket means including a pivotal connection between the associated edge of the shield and the associated window reveal for permitting said swinging movement of the shield, and means for adjusting one of said reveal engaging means toward or away from another to bring said reveal engaging means into engagement with the reveals.

13. In combination with an opening having bordering walls, a shield positioned to swing in and out of said opening, pivotal connections between opposite shield edges and the proximate walls of the opening, an enclosure within one of said connections, a stationary friction device within the enclosure, and a compression spring within the enclosure bearing against the friction device for creating a resistance to turning movements of the shield.

14. A wind wing comprising separate brackets adapted for mounting on the window frame of an automobile on the upper and lower edges thereof to engage opposite edges of a pane, one of said brackets comprising a base to be tightly mounted over a ledge of said window frame, a pivotal pane clamping member, and a swivel connection securing said clamping member to said base, the other bracket comprising a foot to be tightly mounted over the opposite ledge of said frame, a pivotal clamping member having a pane receiving channel, a resiliently longitudinally expansible post securing said foot to said clamping member and urging the clamping member away from said foot and applying a spreading pressure to said brackets to hold them against the upper and lower ledges of said window frame.

15. A ventilating device for the window openings of automobiles having opposed supporting members, comprising a plate of glass, holding devices on opposite extremities of said glass, brackets engaging said supporting members of the window, attaching means connecting said holding devices with said brackets, said attaching means including means for tensioning and holding said brackets in operative position and additionally holding said glass in adjusted position for use, and means to permit self-adjustment of said glass to compensate for misalignment of the parts.

16. In combination a frame having an opening bounded by reveals, pads formed for surface engagement with the upper and lower of said reveals, a shield disposed between said pads, aligned pivot members connected to opposite edges of said shield co-acting with said pads, one of said members being adjustable for varying the contact pressure of said pads with their associated reveals, and friction means associated with the other of said members for resisting rotation of said shield about its pivotal axis in accordance with the adjustment of said adjustable member.

17. A wind shield comprising a transparent member, engaging devices at the top and bottom thereof, clamping devices at the top and bottom for engagement with the window frame members and movably connected with said engaging devices, and a braking device interposed in the connection between one of said clamping devices and its associated engaging device for resisting the relative movement between them, said latter clamping device having an upstanding part, and a pivotal connection between said upstanding part and the braking device.

18. A wind shield comprising a transparent member, engaging devices at the top and bottom thereof, clamping devices at the top and bottom for engagement with the window frame members and movably connected with said engaging devices, and a braking device interposed in the connection between one of said clamping devices and its associated engaging device, for resisting the relative movement between them, said latter clamping device having an upstanding part, and a pivotal connection between said upstanding part and the braking device, said pivotal connection being within the plane of the window frame members.

19. A wind shield for automobiles having a window opening bounded by reveals comprising a transparent member mounted in said window opening, a top pivot connected with the top of said transparent member and a bottom pivot connected with the bottom of said transparent member, said pivots being connected respectively with the upper and lower reveals of the window so as to be held against lateral displacement by said reveals, the opposing ends of said pivots ending substantially at the upper and lower edges of said transparent member so that they do not obstruct the view through said transparent member, said pivots being located intermediate the front and rear edges of said transparent member and also located within the plane of the reveals so that one end of the transparent member may be moved inwardly into the automobile to provide a circulating current of air for the interior of the automobile and a friction device connected with one of said pivots for holding said transparent member against movement from any of its adjusted positions, by the air pressure caused by the movement of the automobile.

WILLARD L. MORRISON.